US012684332B2

(12) United States Patent
Somasekhar

(10) Patent No.: US 12,684,332 B2
(45) Date of Patent: Jul. 14, 2026

(54) SYSTEM AND METHOD FOR SEAMLESS MOBILE PLAN SIGNUP AND ACTIVATION

(71) Applicant: Samsung Electronics Co., Ltd., Suwon-si (KR)

(72) Inventor: Rajeshkumar Somasekhar, Skillman, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/490,486

(22) Filed: Oct. 19, 2023

(65) Prior Publication Data

US 2025/0113174 A1      Apr. 3, 2025

Related U.S. Application Data

(60) Provisional application No. 63/541,200, filed on Sep. 28, 2023.

(51) Int. Cl.
| | |
|---|---|
| *H04W 24/02* | (2009.01) |
| *H04W 8/18* | (2009.01) |
| *H04W 12/069* | (2021.01) |
| *H04W 12/72* | (2021.01) |
| *H04W 88/02* | (2009.01) |

(52) U.S. Cl.
CPC ......... *H04W 8/183* (2013.01); *H04W 12/069* (2021.01); *H04W 12/72* (2021.01)

(58) Field of Classification Search
CPC ... H04W 12/069; H04W 8/183; H04W 12/72; H04W 8/205

USPC ......................................................... 455/418
See application file for complete search history.

(56) References Cited

U.S. PATENT DOCUMENTS

| | | | |
|---|---|---|---|
| 9,648,492 | B2 | 5/2017 | Mallikarjunan et al. |
| 10,200,837 | B1 | 2/2019 | Steck |
| 10,455,536 | B1 | 10/2019 | Khawand et al. |
| 10,743,176 | B1 | 8/2020 | Khan et al. |
| 11,089,480 | B2 | 8/2021 | Yang et al. |
| 11,622,260 | B2 | 4/2023 | Shah et al. |
| 2017/0099152 | A1* | 4/2017 | Kojima ................. H04L 9/3263 |
| 2018/0176768 | A1* | 6/2018 | Baek ..................... H04W 8/205 |
| 2023/0020761 | A1 | 1/2023 | Chaugule et al. |
| 2023/0020828 | A1 | 1/2023 | Li et al. |
| 2023/0209340 | A1* | 6/2023 | Kang ..................... H04W 8/20 |

OTHER PUBLICATIONS

IP.com search history (Year: 2025).*

* cited by examiner

*Primary Examiner* — Moustapha Diaby

(57) ABSTRACT

A method includes wirelessly coupling a device to a packet data network (PDN) of a mobile network operator (MNO), where the device does not have an international mobile subscriber identifier (IMSI). The method also includes obtaining, by the device, subscription plan information from the MNO using a first mobile network application programming interface (API) and an application identifier that enables the MNO to bypass an authentication requirement for invoking APIs. The method further includes receiving an input of a selected subscription plan from a user. In addition, the method includes receiving an embedded subscriber identification module (eSIM) profile for the device from the MNO based on the selected subscription plan.

20 Claims, 6 Drawing Sheets

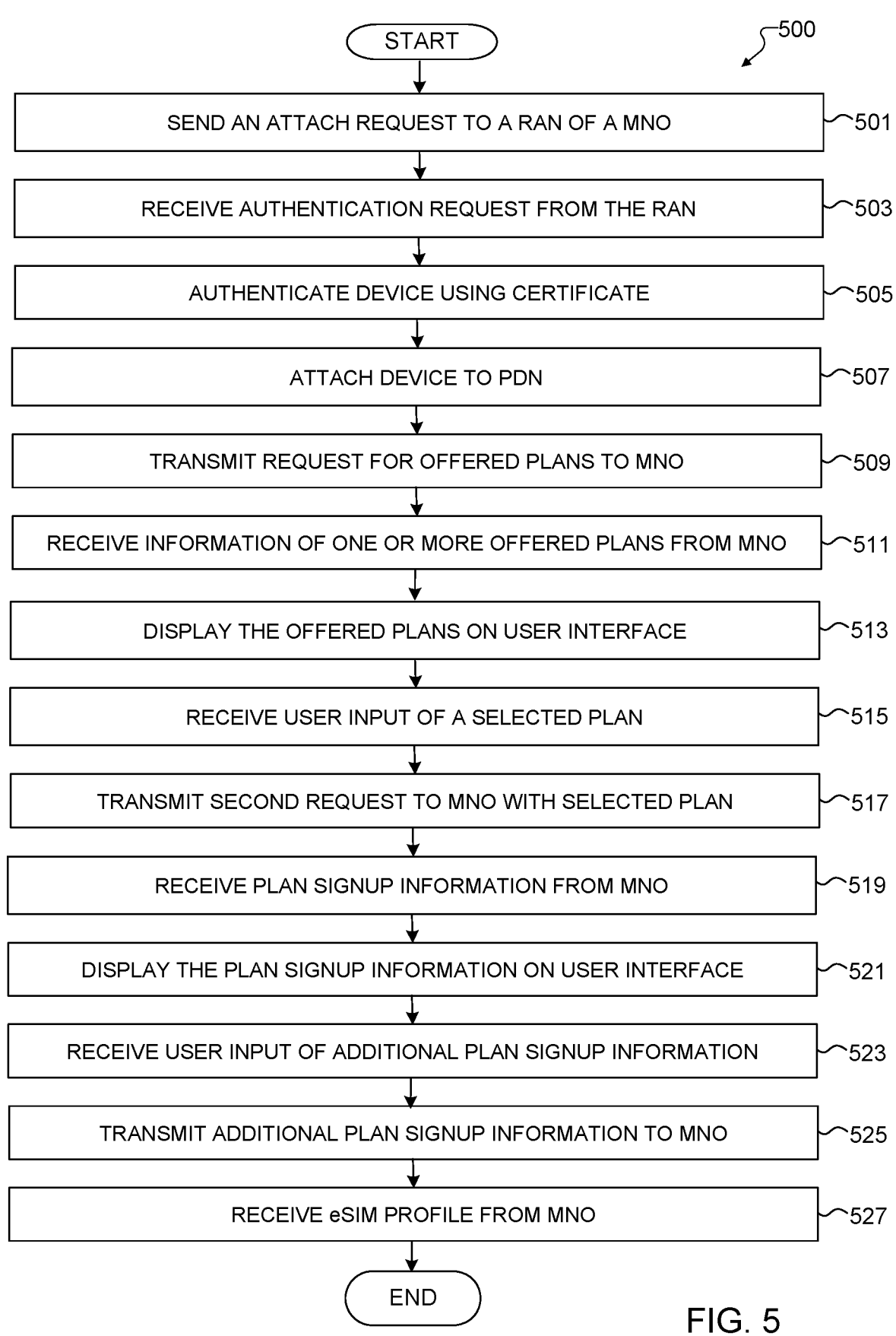

START

500

SEND AN ATTACH REQUEST TO A RAN OF A MNO — 501

RECEIVE AUTHENTICATION REQUEST FROM THE RAN — 503

AUTHENTICATE DEVICE USING CERTIFICATE — 505

ATTACH DEVICE TO PDN — 507

TRANSMIT REQUEST FOR OFFERED PLANS TO MNO — 509

RECEIVE INFORMATION OF ONE OR MORE OFFERED PLANS FROM MNO — 511

DISPLAY THE OFFERED PLANS ON USER INTERFACE — 513

RECEIVE USER INPUT OF A SELECTED PLAN — 515

TRANSMIT SECOND REQUEST TO MNO WITH SELECTED PLAN — 517

RECEIVE PLAN SIGNUP INFORMATION FROM MNO — 519

DISPLAY THE PLAN SIGNUP INFORMATION ON USER INTERFACE — 521

RECEIVE USER INPUT OF ADDITIONAL PLAN SIGNUP INFORMATION — 523

TRANSMIT ADDITIONAL PLAN SIGNUP INFORMATION TO MNO — 525

RECEIVE eSIM PROFILE FROM MNO — 527

END

FIG. 5

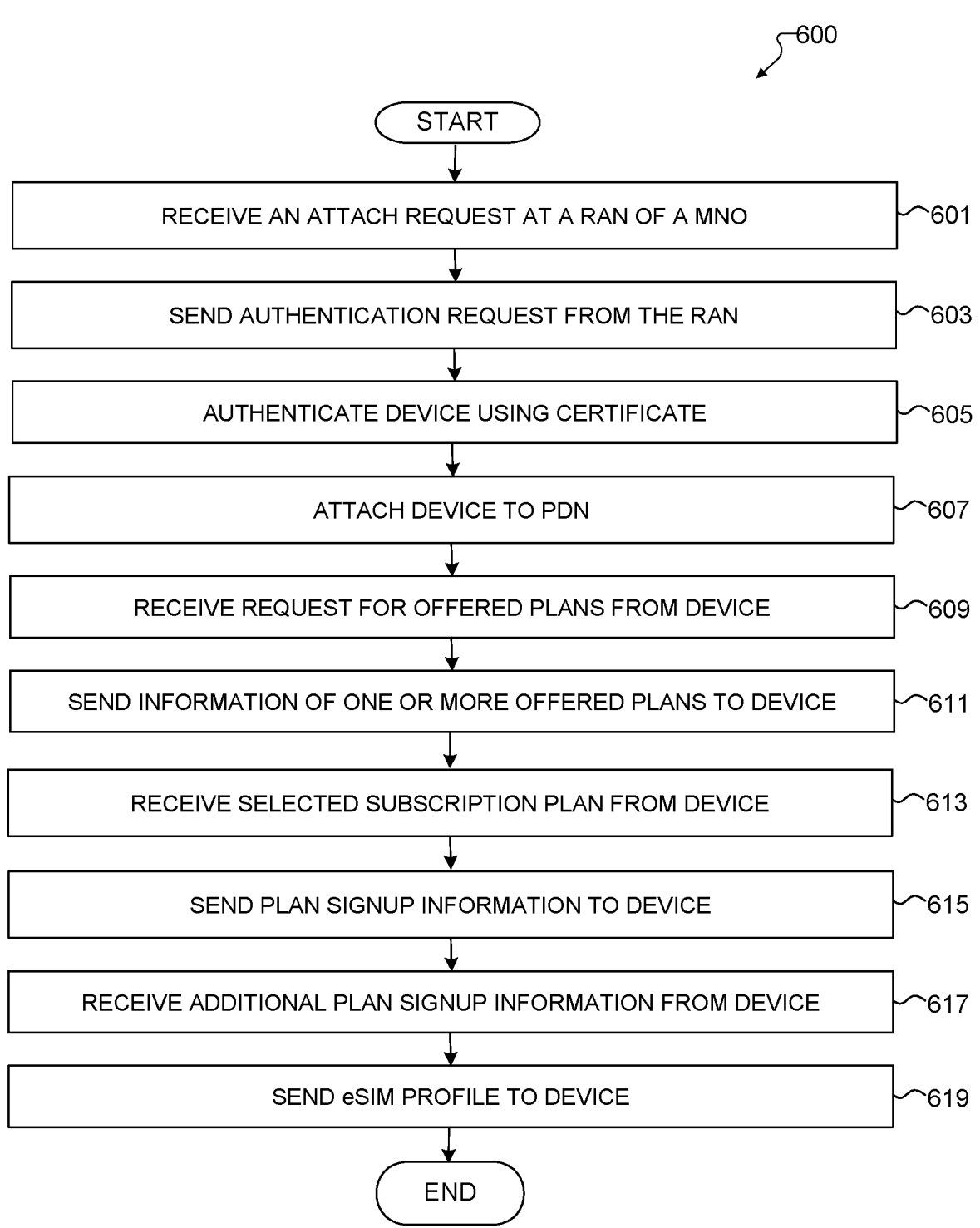

600

START

RECEIVE AN ATTACH REQUEST AT A RAN OF A MNO  601

SEND AUTHENTICATION REQUEST FROM THE RAN  603

AUTHENTICATE DEVICE USING CERTIFICATE  605

ATTACH DEVICE TO PDN  607

RECEIVE REQUEST FOR OFFERED PLANS FROM DEVICE  609

SEND INFORMATION OF ONE OR MORE OFFERED PLANS TO DEVICE  611

RECEIVE SELECTED SUBSCRIPTION PLAN FROM DEVICE  613

SEND PLAN SIGNUP INFORMATION TO DEVICE  615

RECEIVE ADDITIONAL PLAN SIGNUP INFORMATION FROM DEVICE  617

SEND eSIM PROFILE TO DEVICE  619

END

FIG. 6

SYSTEM AND METHOD FOR SEAMLESS MOBILE PLAN SIGNUP AND ACTIVATION

CROSS-REFERENCE TO RELATED APPLICATION AND PRIORITY CLAIM

This application claims priority under 35 U.S.C. § 119 (e) to U.S. Provisional Patent Application No. 63/541,200 filed on Sep. 28, 2023, which is hereby incorporated by reference in its entirety.

TECHNICAL FIELD

This disclosure relates generally to wireless communication services. More specifically, this disclosure relates to a system and method for seamless mobile plan signup and activation.

BACKGROUND

Mobile devices, such as smartphones and tablet computers, typically need to be activated with a user subscription in order to access a wireless cellular network. To activate a subscription on a mobile device, a user may need to insert a physical subscriber identification module (SIM) card in the mobile device's physical SIM slot or download information onto an embedded SIM (eSIM) over the air from a mobile network operator (MNO). For example, information may be downloaded onto an eSIM from an MNO network element, such as a remote SIM provisioning server. The mobile device industry is moving towards the use of eSIMs over physical SIMs since eSIMs provide cost advantages, such as no shipping of physical SIM cards to the end users, and provide flexibility to the end users.

SUMMARY

This disclosure provides a system and method for seamless mobile plan signup and activation.

In a first embodiment, a method includes wirelessly coupling a device to a packet data network (PDN) of a mobile network operator (MNO), where the device does not have an international mobile subscriber identifier (IMSI). The method also includes obtaining, by the device, subscription plan information from the MNO using a first mobile network application programming interface (API) and an application identifier that enables the MNO to bypass an authentication requirement for invoking APIs. The method further includes receiving an input of a selected subscription plan from a user. In addition, the method includes receiving an embedded subscriber identification module (eSIM) profile for the device from the MNO based on the selected subscription plan. In another embodiment, a non-transitory machine readable medium includes instructions that when executed cause at least one processor to perform the method of the first embodiment.

In a second embodiment, an electronic device includes at least one processing device configured to wirelessly couple the electronic device to a PDN of an MNO, where the electronic device does not have an IMSI. The at least one processing device is also configured to obtain subscription plan information from the MNO using a first mobile network API and an application identifier that enables the MNO to bypass an authentication requirement for invoking APIs. The at least one processing device is further configured to receive an input of a selected subscription plan from a user. In addition, the at least one processing device is configured to receive an eSIM profile for the electronic device from the MNO based on the selected subscription plan.

In a third embodiment, a method includes providing, to a device wirelessly coupled to a PDN of an MNO without having an IMSI, subscription plan information from the MNO using a first mobile network API and an application identifier that enables the MNO to bypass an authentication requirement for invoking APIs. The method also includes receiving a selected subscription plan from the device. The method further includes providing an eSIM profile for the device from the MNO based on the selected subscription plan. In another embodiment, an electronic device includes at least one processing device configured to perform the method of the third embodiment. In still another embodiment, a non-transitory machine readable medium includes instructions that when executed cause at least one processor to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 5 illustrates an example method for seamless mobile plan signup and activation at a mobile device according to this disclosure; and FIG. 6 illustrates an example method for seamless mobile plan signup and activation at a mobile network operator according to this disclosure.

DETAILED DESCRIPTION

Figure 1:
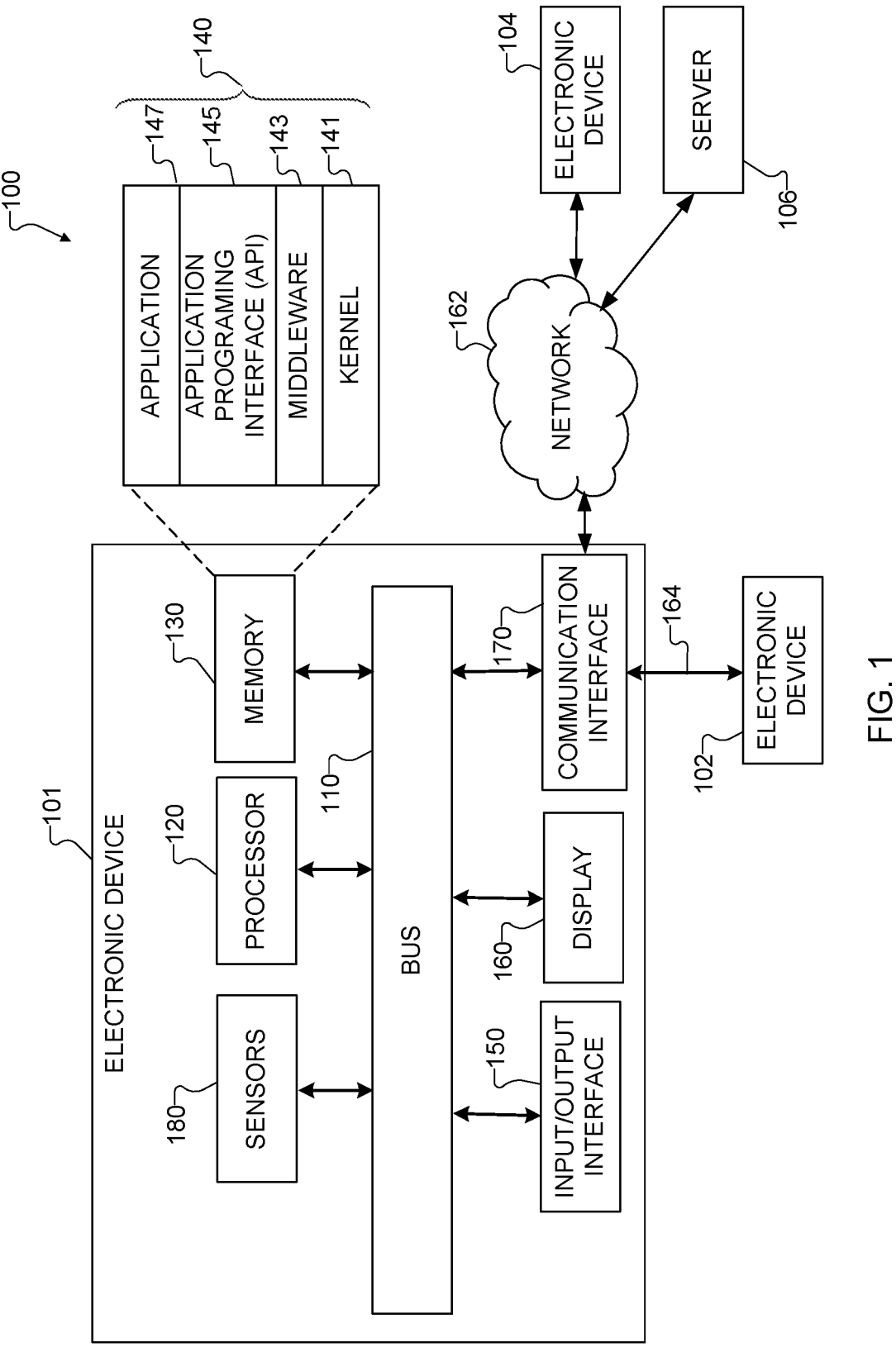
FIG. 1 illustrates an example network configuration including an electronic device according to this disclosure.

FIGS. 1 through 6, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, mobile devices, such as smartphones and tablet computers, typically need to be activated with a user subscription in order to access a wireless cellular network. To activate a subscription on a mobile device, a user may need to insert a physical subscriber identification module (SIM) card in the mobile device's physical SIM slot or download information onto an embedded SIM (eSIM) over the air from a mobile network operator (MNO). For example, information may be downloaded onto an eSIM from an MNO network element, such as a remote SIM provisioning server. The mobile device industry is moving towards the use of eSIMs over physical SIMs since eSIMs provide cost advantages, such as no shipping of physical SIM cards to the end users, and provide flexibility to the end users.

While activating a mobile device using an eSIM comes with advantages, there are some limitations, as well. For example, the mobile device may need access to a Wi-Fi network for connectivity to a remote SIM provisioning server in order to download information onto the eSIM or sign up for an eSIM mobile plan. A user will therefore have to search for a suitable Wi-Fi network in order to purchase a mobile subscription and activate the eSIM. In addition, the mobile plan signup process often requires a user to perform multiple steps in order to search for and subscribe to a mobile plan and perform additional steps to download information onto an eSIM. Existing standards have various limitations, such as a need for an access token in order to invoke application programming interfaces (APIs) for initiating mobile plan discovery or signup, which makes it difficult for implementation of these call flows. An alternate solution of bootstrapping a provisioning profile within a mobile device is expensive for manufacturers since they have to pay for initial connectivity on an end user's device in order to activate a mobile subscription.

This disclosure provides various techniques for seamless mobile plan signup and activation. As described in more detail below, a device can be communicatively attached or wirelessly coupled to a packet data network (PDN) of an MNO, where the device does not have an international mobile subscriber identifier (IMSI). The device can obtain subscription plan information from the MNO using a mobile network API and an application identifier that enables the MNO to bypass an authentication requirement for invoking APIs. An input of a selected subscription plan can be received from a user, and an eSIM profile can be received for the device from the MNO based on the selected subscription plan. In this way, the disclosed techniques make mobile plan signup and activation seamless by eliminating the need for a Wi-Fi network while activating an eSIM profile for a mobile device and by allowing a user to discover mobile plans and complete a signup process more easily.

Note that while some of the embodiments discussed below are described in the context of use in consumer electronic devices (such as smartphones), this is merely one example. It will be understood that the principles of this disclosure may be implemented in any number of other suitable contexts and may use any suitable devices.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for seamless mobile plan signup and activation.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device

101 to control or manage the system resources. The application 147 may support one or more functions for seamless mobile plan signup and activation as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, Wi-Fi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset with a display panel or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for seamless mobile plan signup and activation.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
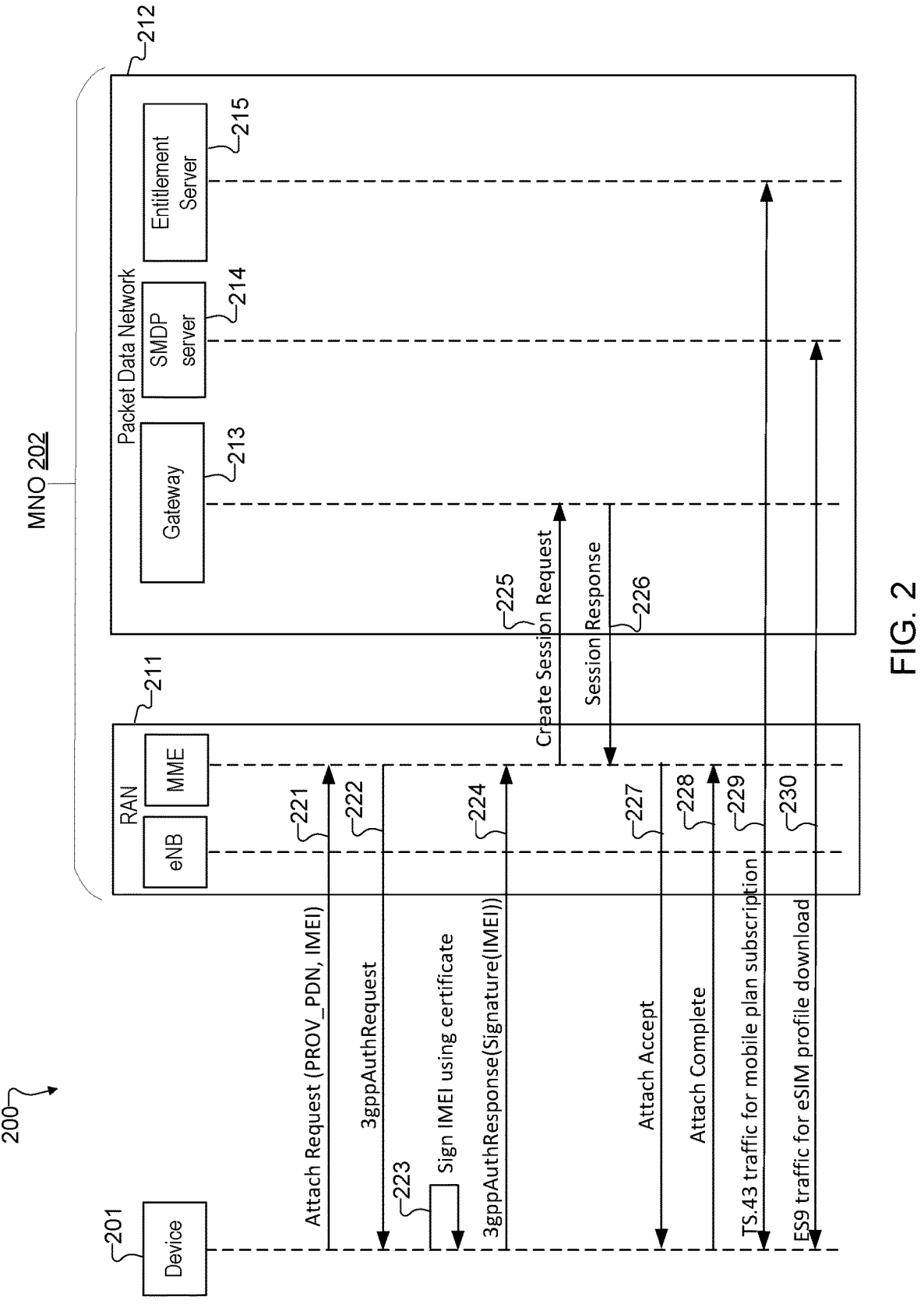
FIG. 2 illustrates an example process for seamless mobile plan signup and activation according to this disclosure.

FIG. 2 illustrates an example process 200 for seamless mobile plan signup and activation according to this disclosure. For ease of explanation, the process 200 is described as being implemented using a device 201 and an MNO 202, which can represent components of the network configuration 100 of FIG. 1 described above. As a particular example, the device 201 may represent the electronic device 101, and the MNO 202 may represent the server 106. However, this is merely one example, and the process 200 could be implemented using any other suitable device(s) and in any other suitable system(s).

As shown in FIG. 2, the device 201 represents a mobile device (such as a smartphone or tablet computer) that does not yet have an international mobile subscriber identifier (IMSI). However, the device 201 is ready to be activated on a mobile subscription and receive plan information and an eSIM profile. The MNO 202 includes a radio access network (RAN) 211 and also hosts a packet data network (PDN) 212 for allowing data network access for eSIM activation flows. The PDN 212 can include a gateway 213 and a provisioning system that includes a Subscription Manager Data Preparation (SMDP) server 214 and an entitlement server 215. The SMDP server 214 can generate a profile for an eSIM, and the entitlement server 215 can share information with the device 201 for mobile plan subscription information as described in greater detail below. The MNO 202 can grant access to the PDN 212 to the device 201 even when the device 201 does not have an IMSI.

At operation 221, the device 201 sends an attach request to the RAN 211. In some embodiments, the attach request can include a name or identifier of the PDN 212 (such as 'PROV_PDN') and an international mobile equipment identity (IMEI) of the device 201. At operation 222, the RAN 211 responds by sending an authentication request (such as 3gppAuthRequest) to the device 201. In some embodiments, the authentication process uses one or more 3GPP-compliant certificates, which may be stored securely on the device 201 (such as in its modem chipset) and also configured on the RAN 211. In particular embodiments, 3GPP can issue the certificates to the device 201 and the RAN 211. At operation 223, in response to receiving the authentication request, the device 201 generates a signature using the certificate and the IMEI of the device 201. In some embodiments, the signature authenticates the identity of the device 201 to the RAN 211 and ensures that the attach request is coming from a legitimate device. At operation 224, the device 201 sends an authentication response (such as 3gppAuthResponse) with the signature to the RAN 211.

At operation 225, in response to receiving the authentication response from the device 201, the RAN 211 sends a 'Create Session Request' message to the gateway 213 of the PDN 212 in order to grant access to the PDN 212 to the device 201. At operation 226, the gateway 213 sends a 'Session Response' message to the RAN 211, which confirms the new session. At operation 227, the RAN 211 sends an 'Attach Accept' message to the device 201, which informs the device 201 about the new session with the PDN 212. At operation 228, in response to receiving the 'Attach Accept' message, the device 201 sends an 'Attach Complete' message to the RAN 211. This successfully completes the communicative attachment or wireless coupling of the device 201 to the PDN 212.

After the device 201 has been communicatively attached to the PDN 212, the device 201 can determine the server address of the SMDP server 214 and check with the SMDP server 214 to determine if there is a pending eSIM subscription for download. If no eSIM subscription is found, the device 201 performs operation 229, which includes a subscription plan signup process. In some embodiments, the subscription plan signup process can be a GSM Association (GSMA) TS43-based signup process, which is described in greater detail below in conjunction with FIG. 3. If the eSIM subscription is found, the device 201 performs operation 230, which includes an eSIM activation process and an eSIM profile download.

Figure 3:
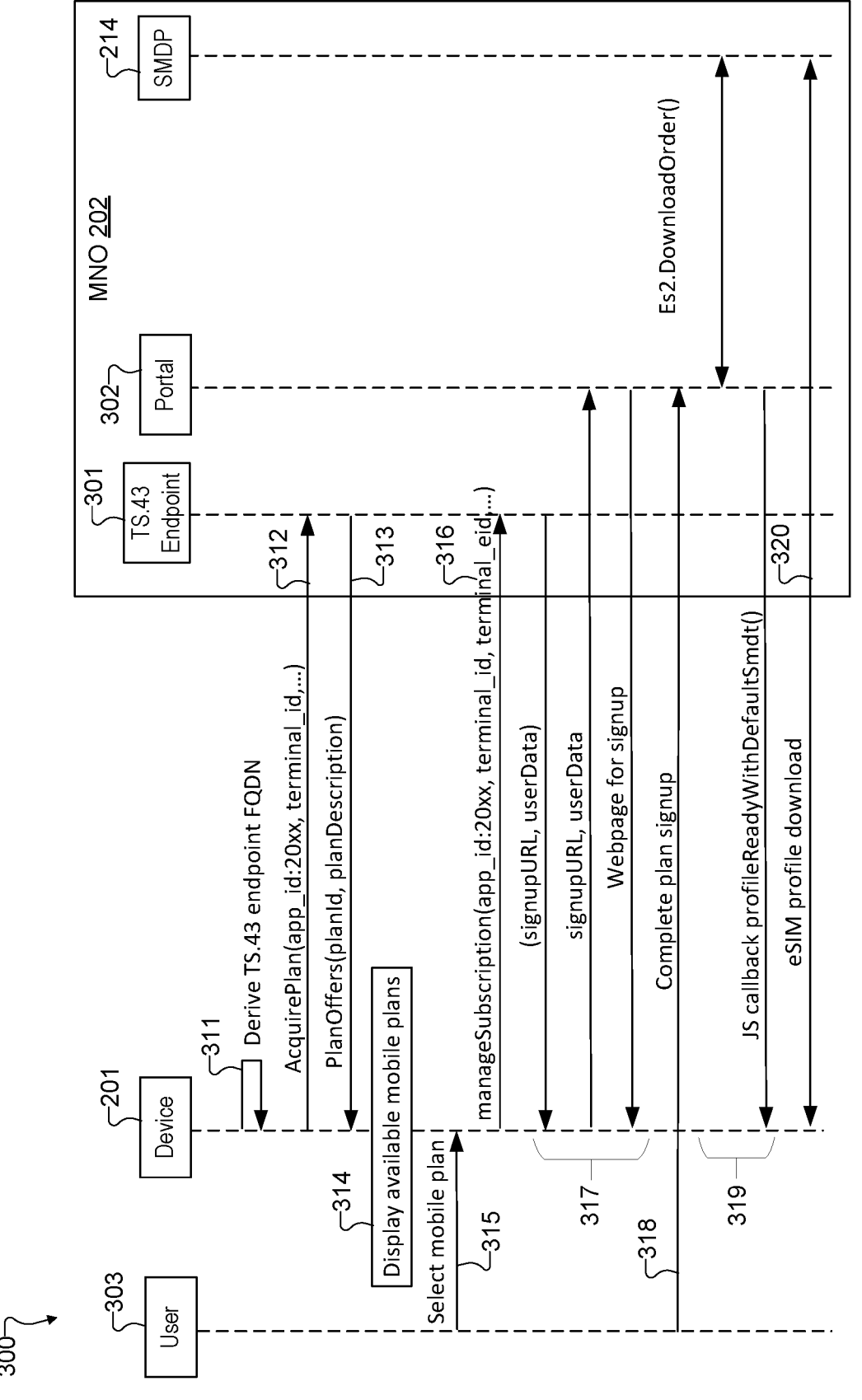
FIG. 3 illustrates an example subscription plan signup process according to this disclosure.

FIG. 3 illustrates an example subscription plan signup process 300 according to this disclosure. In some embodiments, the signup process 300 can represent (or be represented by) the operation 229 of the process 200 of FIG. 2. For ease of explanation, the signup process 300 is described as being implemented using the device 201 and the MNO 202 of FIG. 2. However, this is merely one example, and the signup process 300 could be implemented using any other suitable device(s) and in any other suitable system(s).

As shown in FIG. 3, the process 300 includes communication between the device 201 and the MNO 202. The MNO 202 includes the SMDP server 214, a TS.43 endpoint 301, and a web portal 302. In some cases, the endpoint 301 and the web portal 302 can be part of the entitlement server 215. The device 201 is associated with a user 303, such as an owner or operator of the device 201. As discussed above in conjunction with FIG. 2, the process 300 is initiated once the device 201 is communicatively attached to the MNO 202. At this point, the device 201 still has not been activated with a subscription plan or received an eSIM profile. The process 300 is performed to obtain subscription plan information from the MNO 202 and complete the subscription plan signup and to download an eSIM profile to the device 201.

At operation 311, the device 201 generates a Fully Qualified Domain Name (FQDN) of the TS.43 endpoint 301 based on the Mobile Country Code (MCC) and the Mobile Network Code (MNC) of the MNO 202. In some embodiments, the FQDN can have a format as defined in the TS.43 API specification. For example, the FQDN can have a format of aes.mnc<MNC>.mcc<MCC>.pub.3gppnetwork.org.

At operation 312, the device 201 invokes the TS.43 AcquirePlan application programming interface (API), which results in sending information to the TS.43 endpoint 301. The API call includes various fields, such as an application identifier (app_id) and a terminal identifier (terminal_id). In some embodiments, the app_id can be a newly-introduced app_id value (such as 20xx-Mobile plan discovery and signup), which enables or instructs the MNO 202 to bypass a TS.43 authentication requirement for invoking APIs. That is, when the MNO 202 receives the invocation of the AcquirePlan API with the app_id equal to the new value, the MNO 202 skips the TS.43 authentication process that is typically performed when a TS.43 API is invoked. This is useful since the device 201 does not yet have an IMSI and would not be able to be authenticated in a conventional TS.43 authentication process.

Figure 4:
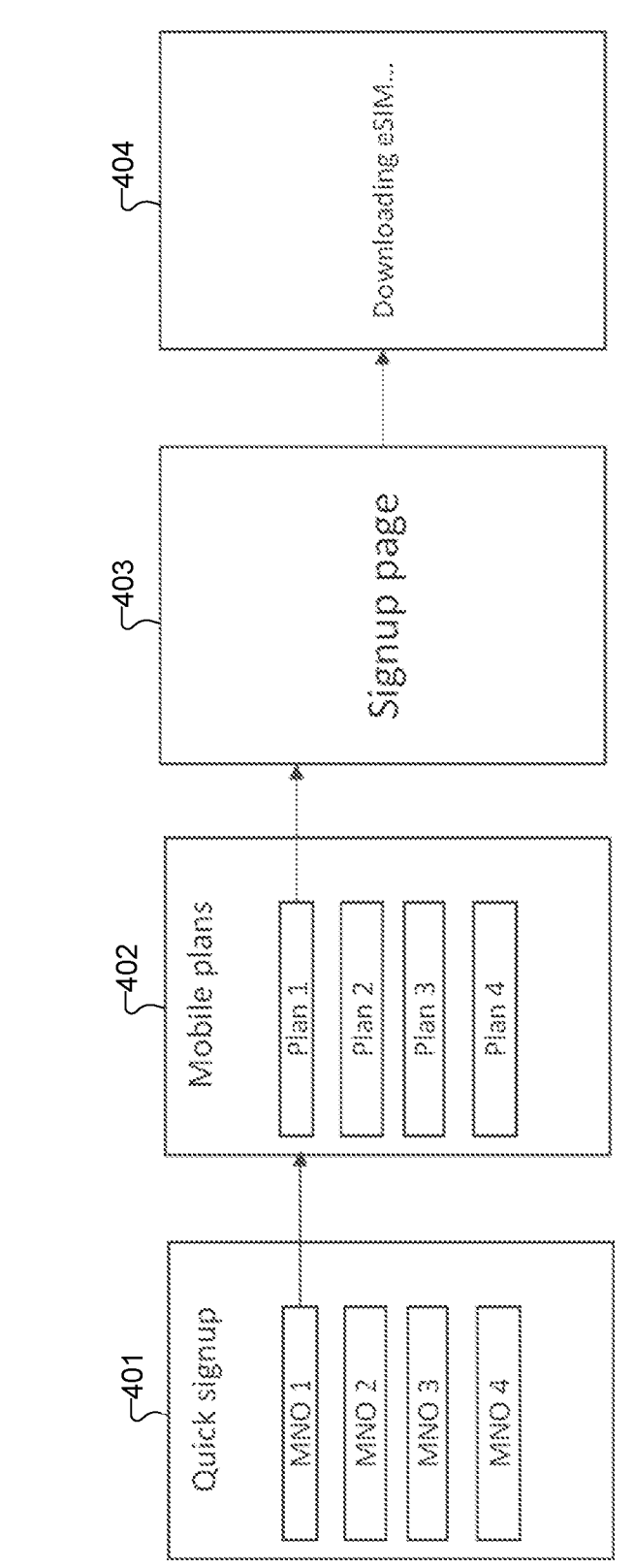
FIG. 4 illustrates an example user interface of a device during a mobile plan signup according to this disclosure.

At operation 313, in response to the AcquirePlan API, the TS.43 endpoint 301 provides information regarding one or more subscription plans offered by the MNO 202 to the device 201 via the PlanOffers parameters of the AcquirePlan API. Each of the offered subscription plans may include a plan identifier and a plan description. At operation 314, the device 201 displays the offered subscription plan(s) and the description(s) on a user interface shown on a display of the device 201 (such as the display 160). For example, FIG. 4 illustrates an example user interface 400 of the device 201 during a mobile plan signup according to this disclosure. As shown in FIG. 4, the user interface 400 initially shows a first window 401, where a list of MNOs (such as 'MNO 1', 'MNO 2', 'MNO 3', and 'MNO 4') available to the device 201 can be displayed. After the user selects an MNO 202 (such as 'MNO 1'), operations 311-314 are performed, and the user interface 400 shows a second window 402 with a list of mobile plans offered by the selected MNO 202 (such as 'Plan 1', "Plan 2', 'Plan 3', and 'Plan 4'). At operation 315, the user 303 selects a desired mobile plan among the list of mobile plans, such as when the user 303 selects a desired mobile plan by touching a control on the window 402.

At operation 316, the device 201 invokes the TS.43 ManageSubscription API, which results in sending information to the TS.43 endpoint 301. The API call includes various fields, such as the app_id, the terminal_id, a terminal eUICC identifier (terminal_eid), and a plan identifier (plan_id) of the plan selected by the user. Again, the app_id may contain a value that enables or instructs the MNO 202 to bypass the TS.43 authentication requirement for invoking APIs. At operation 317, the device 201, the TS.41 endpoint 301, and the web portal 302 exchange messages so that the web portal 302 provides a plan signup webpage, which the device 201 can display on its user interface. The signup webpage may include plan signup information corresponding to the selected subscription plan. For example, in FIG. 4, the user interface 400 shows another window 403, which is the signup webpage. At operation 318, on the signup webpage on the user interface 400, the user 303 can complete the plan signup, which may include inputting additional plan signup information, such as information specific to the user 303 like name, address, selected plan options, payment method, and the like. The additional plan signup information can be transmitted to the MNO 202.

At operation 319, additional housekeeping messages are exchanged between the device 201, the web portal 302, and the SMDP server 214 in order to prepare for downloading of the eSIM profile to the device 201. At operation 320, the eSIM profile is downloaded from the SMDP server 214 to the device 201. This can represent all or portions of the operation 230 shown in FIG. 2. In some embodiments, the user interface 400 can include another window 404 that shows progress of the eSIM download.

Although FIGS. 2 through 4 illustrate one example of a process 200 for seamless mobile plan signup and activation and related details, various changes may be made to FIGS.

2 through 4. For example, while the processes 200 and 300 are described as involving specific sequences of operations, various operations described with respect to FIGS. 2 and 3 could overlap, occur in parallel, occur in a different order, or occur any number of times (including zero times). Also, the specific operations shown in FIGS. 2 and 3 are examples only, and other techniques could be used to perform each of the operations shown in FIGS. 2 and 3. For instance, various operations shown in FIGS. 2 and 3 can include any other suitable APIs negotiated between the MNO 202 and the manufacturer of the device 201. In addition, the user interface 400 shown in FIG. 4 is for illustration and explanation only, and the contents, layout, and arrangement of information in the user interface 400 can easily vary as needed or desired.

FIG. 5 illustrates an example method 500 for seamless mobile plan signup and activation at a mobile device according to this disclosure. For ease of explanation, the method 500 shown in FIG. 5 is described as being performed using the device 201 and the processes 200 and 300 shown in FIGS. 2 and 3. In some embodiments, the device 201 can represent the electronic device 101 of FIG. 1. However, the method 500 shown in FIG. 5 could be used with any other suitable device(s) or system(s).

As shown in FIG. 5, at step 501, an attach request is sent to a RAN associated with a PDN. This could include, for example, the device 201 sending an attach request to the RAN 211, such as in operation 221. At step 503, an authentication request is received from the RAN. This could include, for example, the device 201 receiving an authentication request from the RAN 211, such as in operation 222. At step 505, responsive to the authentication request, the device is authenticated using a certificate that is stored on the device and also configured on the RAN. This could include, for example, the device 201 sending an authentication response with the signed certificate to the RAN 211, such as in operation 224. At step 507, the device is communicatively attached or wirelessly coupled to the PDN. This could include, for example, the device 201 communicatively attaching to the PDN 212, such as in operation 228.

At operation 509, a request for offered subscription plans is transmitted to the MNO, such as by using a TS.43 API and an application identifier. This could include, for example, the device 201 invoking the TS.43 AcquirePlan API with app_id and terminal_id, such as in operation 312. At operation 511, information of one or more offered subscription plans is received from the MNO. This could include, for example, the device 201 receiving information of one or more offered subscription plans from the MNO 202, such as in operation 313. At operation 513, the one or more offered subscription plans are displayed on a user interface of the device. This could include, for example, the device 201 displaying the one or more offered subscription plans on the user interface 400, such as in operation 314. At operation 515, an input of a selected subscription plan is received from a user. This could include, for example, the device 201 receiving an input of a selected subscription plan from the user 303, such as in operation 315.

At operation 517, a second request is transmitted to the MNO, such as by using a second TS.43 API, an identifier of the selected subscription plan, and the application identifier. This could include, for example, the device 201 invoking the TS.43 ManageSubscription API, which results in sending information to the TS.43 endpoint 301, such as in operation 316. At operation 519, plan signup information is received from the MNO in response to the second request. The plan signup information corresponds to the selected subscription plan. This could include, for example, the device 201 receiving plan signup information from the MNO 202, such as in operation 317. At operation 521, the plan signup information is displayed on the user interface. This could include, for example, the device 201 displaying the plan signup information on the user interface 400, such as in operation 317. At operation 523, an input of additional plan signup information is received from the user. This could include, for example, the device 201 receiving an input of additional plan signup information from the user 303, such as in operation 318. At operation 525, the additional plan signup information is transmitted to the MNO. This could include, for example, the device 201 transmitting the additional plan signup information to the MNO 202, such as in operation 318. At operation 527, the eSIM profile is received from the MNO in response to the additional plan signup information. This could include, for example, the device 201 receiving the eSIM profile from the MNO 202, such as in operation 320.

Although FIG. 5 illustrates one example of a method 500 for seamless mobile plan signup and activation at a mobile device, various changes may be made to FIG. 5. For example, while shown as a series of steps, various steps in FIG. 5 could overlap, occur in parallel, occur in a different order, or occur any number of times (including zero times).

FIG. 6 illustrates an example method 600 for seamless mobile plan signup and activation at an MNO according to this disclosure. For ease of explanation, the method 600 shown in FIG. 6 is described as being performed using the MNO 202 and the processes 200 and 300 shown in FIGS. 2 and 3. In some embodiments, the MNO 202 can represent one or more servers 106 shown in FIG. 1. However, the method 600 shown in FIG. 6 could be used with any other suitable device(s) or system(s).

As shown in FIG. 6, at step 601, an attach request is received at a RAN associated with a PDN. This could include, for example, the MNO 202 receiving an attach request at the RAN 211, such as in operation 221. At operation 603, an authentication request is sent to the device. This could include, for example, the RAN 211 sending an authentication request to the device 201, such as in operation 222. At operation 605, the device is authenticated using a certificate that is stored on the device and also configured on the RAN. This could include, for example, the RAN 211 receiving an authentication response with the signed certificate from the device 201, such as in operation 224. At operation 607, the device is communicatively attached or wirelessly coupled to the PDN. This could include, for example, the MNO 202 communicatively attaching the device to the PDN 212, such as in operation 228.

At operation 609, a request for offered subscription plans is received from the device, such as by using a TS.43 API and an application identifier. This could include, for example, the MNO 202 receiving a TS.43 AcquirePlan API call with app_id and terminal_id, such as in operation 312. At operation 611, information of one or more offered subscription plans is sent to the device. The information is configured to enable the device to display the one or more offered subscription plans on a user interface of the device. This could include, for example, the MNO 202 sending information of one or more offered subscription plans to the device 201, such as in operation 313.

At operation 613, a second request is received from the device, such as by using a second TS.43 API, an identifier of a selected subscription plan, and the application identifier. This could include, for example, the MNO 202 receiving a second request from the device 201 using the ManageSubscription API, such as in operation 316. At operation 615, plan signup information is sent to the device in response to the second request. The plan signup information corresponds to the selected subscription plan. This could include, for example, the MNO 202 sending plan signup information to the device 201, such as in operation 317. At operation 617, additional plan signup information is received from the device based on a user input at the device. This could include, for example, the MNO 202 receiving additional plan signup information from the device 201, such as in operation 318. At operation 619, an eSIM profile is sent from the MNO to the device responsive to the additional plan signup information. This could include, for example, the MNO 202 sending the eSIM profile to the device 201, such as in operation 320.

Although FIG. 6 illustrates one example of a method 600 for seamless mobile plan signup and activation at a MNO, various changes may be made to FIG. 6. For example, while shown as a series of steps, various steps in FIG. 6 could overlap, occur in parallel, occur in a different order, or occur any number of times (including zero times).

The embodiments described above address various challenges that the current TS.43 API specification or other specification has posed to MNOs in their networks. For example, with the introduction of a new app_id value, the MNO 202 can deploy a lightweight TS.43 endpoint 301 to redirect a user 303 to the web portal 302 for plan signup. Since user authentication occurs via the web portal 302, there is no additional authentication or token required for accessing TS.43 APIs. Also, providing access to the MNO 202 for allowing eSIM activation flows can eliminate the overhead for end users to connect to Wi-Fi networks.

The disclosed embodiments are suitable for a wide variety of use cases. For instance, the disclosed embodiments enable eSIM mobile plan subscription from retail stores. In such a use case, a user can purchase a mobile device along with a subscription plan from a retail store. For eSIM download, the retail store can provide connectivity to the user for downloading an eSIM profile to the device. As another example, the disclosed embodiments enable eSIM mobile plan signup and activation during travel. In such a use case, a user travelling in a new area can initiate a search for MNOs that support eSIM mobile plan signup over the air without requiring external data connectivity, such as Wi-Fi. Once found, the device can connect to a PDN of the MNO in order to gain access to the MNO's provisioning system and to signup and complete mobile plan setup on the go.

Note that the operations and functions shown in or described with respect to FIGS. 2 through 6 can be implemented in an electronic device 101, 102, 104, server 106, or other device(s) in any suitable manner. For example, in some embodiments, the operations and functions shown in or described with respect to FIGS. 2 through 6 can be implemented or supported using one or more software applications or other software instructions that are executed by the processor 120 of the electronic device 101, 102, 104, server 106, or other device(s). In other embodiments, at least some of the operations and functions shown in or described with respect to FIGS. 2 through 6 can be implemented or supported using dedicated hardware components. In general, the operations and functions shown in or described with respect to FIGS. 2 through 6 can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   wirelessly coupling a device to a packet data network (PDN) of a mobile network operator (MNO), wherein the device does not have an international mobile subscriber identifier (IMSI);
   obtaining, by the device, subscription plan information from the MNO using a first mobile network application programming interface (API) and an application identifier that enables the MNO to bypass an authentication requirement for invoking APIs even though the device does not have the IMSI and the device is not able to be authenticated in an authentication process of the first mobile network API;
   receiving an input of a selected subscription plan from a user; and
   receiving an embedded subscriber identification module (eSIM) profile for the device from the MNO based on the selected subscription plan.

2. The method of claim 1, wherein wirelessly coupling the device to the PDN of the MNO comprises:
   sending an attach request to a radio access network (RAN) associated with the PDN;
   receiving an authentication request from the RAN;
   responsive to the authentication request, authenticating the device using a certificate that is stored on the device and also configured on the RAN; and
   wirelessly coupling the device to the PDN after authenticating the device.

3. The method of claim 2, wherein the attach request comprises an international mobile equipment identity (IMEI) of the device.

4. The method of claim 1, wherein obtaining the subscription plan information from the MNO comprises:
   transmitting a first request for offered subscription plans to the MNO using the first mobile network API and the application identifier;
   receiving information of one or more offered subscription plans from the MNO; and
   displaying the one or more offered subscription plans on a user interface of the device.

5. The method of claim 4, wherein the first request further comprises a GSM Association (GSMA) TS.43 endpoint Fully Qualified Domain Name (FQDN) that is based on a Mobile Country Code (MCC) and a Mobile Network Code (MNC) of the MNO.

6. The method of claim 4, wherein receiving the eSIM profile from the MNO comprises:
   transmitting a second request to the MNO using a second mobile network API, an identifier of the selected subscription plan, and the application identifier;
   receiving plan signup information from the MNO in response to the second request, the plan signup information corresponding to the selected subscription plan;
   displaying the plan signup information on the user interface;
   receiving an input of additional plan signup information from the user;
   transmitting the additional plan signup information to the MNO; and
   receiving the eSIM profile from the MNO responsive to the additional plan signup information.

7. The method of claim 6, wherein:
   the first mobile network API comprises a GSM Association (GSMA) TS.43 AcquirePlan API; and
   the second mobile network API comprises a GSMA TS.43 ManageSubscription API.

8. An electronic device comprising:
   at least one processing device configured to:
      wirelessly couple the electronic device to a packet data network (PDN) of a mobile network operator (MNO), wherein the electronic device does not have an international mobile subscriber identifier (IMSI);
      obtain subscription plan information from the MNO using a first mobile network application programming interface (API) and an application identifier that enables the MNO to bypass an authentication requirement for invoking APIs even though the electronic device does not have the IMSI and the electronic device is not able to be authenticated in an authentication process of the first mobile network API;
      receive an input of a selected subscription plan from a user; and
      receive an embedded subscriber identification module (eSIM) profile for the electronic device from the MNO based on the selected subscription plan.

9. The electronic device of claim 8, wherein, to wirelessly couple the electronic device to the PDN of the MNO, the at least one processing device is configured to:
   send an attach request to a radio access network (RAN) associated with the PDN;
   receive an authentication request from the RAN;
   responsive to the authentication request, authenticate the electronic device using a certificate that is stored on the electronic device and also configured on the RAN; and
   wirelessly couple the electronic device to the PDN after authenticating the electronic device.

10. The electronic device of claim 9, wherein the attach request comprises an international mobile equipment identity (IMEI) of the electronic device.

11. The electronic device of claim 8, wherein, to obtain the subscription plan information from the MNO, the at least one processing device is configured to:
   transmit a first request for offered subscription plans to the MNO using the first mobile network API and the application identifier;
   receive information of one or more offered subscription plans from the MNO; and
   display the one or more offered subscription plans on a user interface of the electronic device.

12. The electronic device of claim 11, wherein the first request further comprises a GSM Association (GSMA) TS.43 endpoint Fully Qualified Domain Name (FQDN) that is based on a Mobile Country Code (MCC) and a Mobile Network Code (MNC) of the MNO.

13. The electronic device of claim 11, wherein, to receive the eSIM profile from the MNO, the at least one processing device is configured to:
   transmit a second request to the MNO using a second mobile network API, an identifier of the selected subscription plan, and the application identifier;
   receive plan signup information from the MNO in response to the second request, the plan signup information corresponding to the selected subscription plan;
   display the plan signup information on the user interface;
   receive an input of additional plan signup information from the user;
   transmit the additional plan signup information to the MNO; and receive the eSIM profile from the MNO responsive to the additional plan signup information.

14. A method comprising:

providing, to a device wirelessly coupled to a packet data network (PDN) of a mobile network operator (MNO) without having an international mobile subscriber identifier (IMSI), subscription plan information from the MNO using a first mobile network application programming interface (API) and an application identifier that enables the MNO to bypass an authentication requirement for invoking APIs even though the device does not have the IMSI and the device is not able to be authenticated in an authentication process of the first mobile network API;

receiving a selected subscription plan from the device; and providing an embedded subscriber identification module (eSIM) profile for the device from the MNO based on the selected subscription plan.

15. The method of claim 14, further comprising:

receiving an attach request at a radio access network (RAN) associated with the PDN;

sending an authentication request to the device;

authenticating the device using a certificate that is stored on the device and also configured on the RAN; and wirelessly coupling the device to the PDN after authenticating the device.

16. The method of claim 15, wherein the attach request comprises an international mobile equipment identity (IMEI) of the device.

17. The method of claim 14, wherein providing the subscription plan information from the MNO comprises:

receiving a first request for offered subscription plans from the device using the first mobile network API and the application identifier; and sending information of one or more offered subscription plans to the device, wherein the information is configured to enable the device to display the one or more offered subscription plans on a user interface of the device.

18. The method of claim 17, wherein the first request further comprises a GSM Association (GSMA) TS.43 endpoint Fully Qualified Domain Name (FQDN) that is based on a Mobile Country Code (MCC) and a Mobile Network Code (MNC) of the MNO.

19. The method of claim 17, wherein receiving the selected subscription plan from the device and providing the eSIM profile for the device from the MNO comprise:

receiving a second request from the device using a second mobile network API, an identifier of the selected subscription plan, and the application identifier;

sending plan signup information to the device in response to the second request, the plan signup information corresponding to the selected subscription plan;

receiving additional plan signup information from the device based on a user input at the device; and sending the eSIM profile from the MNO to the device responsive to the additional plan signup information.

20. The method of claim 19, wherein:

the first mobile network API comprises a GSM Association (GSMA) TS.43 AcquirePlan API; and the second mobile network API comprises a GSMA TS.43 ManageSubscription API.

* * * * *